July 24, 1951 E. F. HOGAN 2,561,698

DEVICE FOR MONITORING SOUND TRANSMISSIONS BY RADIO

Filed March 23, 1949

INVENTOR.
Edward F. Hogan.
BY Heard Smith Tennant
Attorneys

Patented July 24, 1951 2,561,698

UNITED STATES PATENT OFFICE 2,561,698

DEVICE FOR MONITORING SOUND TRANSMISSIONS BY RADIO

Edward F. Hogan, Andover, Mass.

Application March 23, 1949, Serial No. 82,995

1 Claim. (Cl. 179—100.2)

This invention relates to a device for monitoring or censoring sound transmission by radio and it has for its general object to provide means whereby a monitor or censor listening in on a "live" radio program as it is being produced and transmitted as a continuous operation, may cut out of or delete from the program after said program has been received by the microphone of the broadcasting apparatus, but before it is transmitted from the transmitting apparatus, such portions of the program as he does not wish to have transmitted.

A further object of the invention is to provide means which introduces a time lag or time interval between the reception of any portion of a "live" radio program by the microphone of a broadcasting apparatus and the final transmission thereof from the transmitting station, during which time interval the monitor may render the transmitting station inoperative to transmit such portions of the program as he desires to delete.

These objects are accomplished by recording the live program on a wire or tape and as a continuous operation with the recording and while the recording is going on, broadcasting the recorded program with a short time interval elapsing between the recording of each part of the program and the broadcasting thereof, such short time interval being sufficient so that if the program as recorded contains any matter the monitor or censor wishes to delete, he can render the transmitting facilities inoperative for the portion of time in which it normally would transmit the portion of the program to be deleted.

In order to give an understanding of the invention, I have illustrated in the drawings an embodiment thereof which will now be described, after which the novel features will be pointed out in the appended claim.

Figures 1, 2, 3:
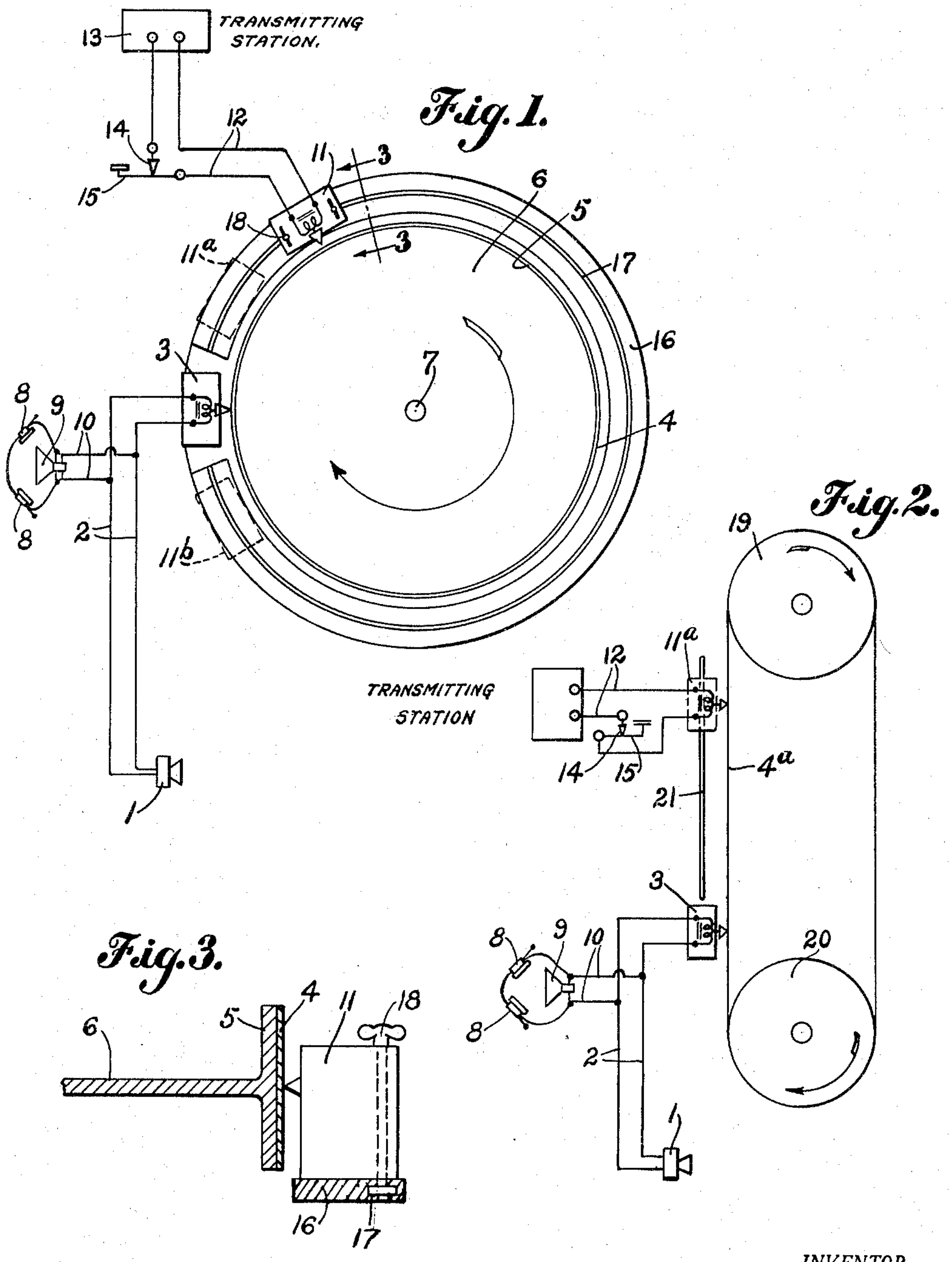
Fig. 1 is a more or less diagrammatic view illustrating an apparatus embodying the invention by which the monitoring of radio programs may be accomplished.
Fig. 2 is a view showing a slightly different embodiment of the invention.
Fig. 3 is an enlarged section on the line 3—3, Fig. 2.

In the drawings 1 indicates a microphone of the broadcasting apparatus which will be located at the point where the program originates, said microphone being connected by wires 2 with a magnetic recording head 3 which is adapted to magnetically record the sounds picked up by the microphone 1 on a wire or tape. In the construction shown in Fig. 1 the recording is done on a tape 4 which is carried on the peripheral flange portion 5 of a rotary disk 6, the latter being mounted for rotation on its supporting shaft 7. Any suitable means, not shown, may be employed for giving the disk 6 with the tape 4 thereon its rotative movement at the correct speed. Connected to the wiring system 2 is a listening device through which the monitor or censor may listen to the program as delivered to the microphone 1. This listening device may be in the form of earphones 8 or in the form of a loud speaker 9, and it is connected to the wires 2 by suitable wire connections 10.

The purpose of this listening device is to enable the monitor or censor to listen to the complete program as it is received by the microphone 1 and as it is recorded on the tape 4.

Associated with the recording head is a pickup head 11 which is spaced from the recording head a suitable distance lengthwise of the tape or wire, said pickup head, which is of any usual or well known construction, is connected by an output wiring system 12 to the transmitting station 13 so that the record on the tape 4 is reproduced by the pickup head 11 and thus relayed to and transmitted from the transmitting station. While the record carried by the wire or tape is being broadcast through the pickup head 11 and transmitting station 13 at the same time that the program received by the microphone 1 is being recorded, yet there is a time lag between the actual recording of any part of the program and the broadcast thereof which is determined by the time it takes any portion of the wire or tape to move from the recording head 3 to the pickup head 11.

The censor or monitor hears the program as it is received by the microphone 1 and as it is recorded, but the actual and final transmission of any part of the program is delayed from the instant of recording by the time taken for any part of the tape or wire to move from the recording head to the pickup head.

Means are provided under the control of the monitor or censor for rendering the transmitting apparatus inoperative, and if during the broadcasting operation the censor hears through his listening device anything which he feels should not be finally transmitted, he may render the transmitting station inoperative temporarily until the portion of the tape or wire on which the objectionable sounds have been recorded have passed beyond the pickup head 11 and thereby such objectionable matter will not be transmitted from the transmitting station.

While any suitable means for rendering the transmitting station inoperative may be employed, it is shown herein as a switch comprising a fixed contact 14 and a movable manually controlled contact 15. Normally the switch is closed so that the circuit 11 is operative to transmit the matter picked up by the pickup head 11 to the transmitting station 13, but if the censor wishes to prevent any part of the program from being finally transmitted, he simply actuates the movable contact 15 to open the switch and thus break the transmitting circuit.

Hence while the recording and the transmitting of the program are going on simultaneously, yet there is sufficient time lag between the recording of any part of the program and its final transmission to enable the monitor or censor to stop the transmitting operation after the objectionable part of the program has been recorded but before it is transmitted so that such objectionable part of the program will not be sent out from the transmitting station.

The recording apparatus herein used is of that known type in which the act of making a record on the tape or wire automatically erases from the tape or wire any previously made record and therefore a relatively short length of tape or wire can be used for transmitting a long program.

In the construction shown the pickup head 11 is made adjustable lengthwise of the wire or tape so that the length of the time lag can be varied as desired. This adjustability of the pickup head may be provided for in various ways. As shown in Figs. 1 and 3 the head 11 is mounted on a supporting member in the form of ring 16 which encircles the disk 6 and which is provided with a slot or groove 17 in which operate clamping bolts 18 which extend through the head 11 and by which the latter is clamped in adjusted position. If it is desired to increase the time interval or time lag between the recording of any part of the program and its pick up by the pickup head 11, the pickup head may be adjusted toward the right, Fig. 1, while if it is desired for any purpose to shorten this time interval, the pickup head will be adjusted toward the left.

In said Fig. 1, the dotted line position of the pickup head indicated at 11*a* is a position in which the time interval is shortened over that which would exist when the pickup head is in the full line position, and the dotted line position 11*b* indicates an adjusted position of the pickup head in which the time interval will be considerably increased over that existing when the pickup head is in the full line position.

The device shown in Fig. 2 is similar to that illustrated in Fig. 1 except that the tape or wire 4*a* passes around and is guided by two direction pulleys 19 and 20 and the pickup head 11*c* is mounted for adjustment in a direction parallel to one run of the tape or wire 4*a*, said pickup head being carried by a suitable support 21 and being adjustable longitudinally thereof.

In other respects the device shown in Fig. 4 is the same as that shown in Fig. 1.

While I have described the monitoring device as it might be used in monitoring radio programs, yet the invention is equally applicable for monitoring telephone conversations or telegraphy transmission. For monitoring telephone conversations the microphone 1 would be in the form of a telephone transmitter and the circuit 12 from the pickup head 11 would lead to the receiver at the other end of the telephone circuit, so that the monitor or censor could prevent the reception by the receiver of any part of the remarks made by the person speaking into the transmitter which said censor did not wish to have transmitted. In the same manner the device could be used for monitoring or delaying the transmission of telegraph messages.

I claim:

A device for monitoring sound transmission comprising a recording wire movable in the direction of its length, a magnetic recorder for making a magnetic record of a program on said wire as it moves forward, a monitoring listening element coupled to the recorder and through which a monitor may listen to the program as it is being recorded, a stationary, elongated supporting member extending parallel to the wire, a pickup head slidably mounted on said supporting member for manual adjustment thereon in the direction of its length and thus in a direction parallel to the wire, thereby to vary the distance between the recorder and the pickup head, said supporting member holding the pickup head in all of its adjusted positions in position to pick up sounds recorded on the wire, an output circuit connecting said pickup head with a transmitting station, and means operable by the monitor for opening said output circuit, the adjustment of the pickup head on the supporting member providing for varying the time interval between the reception by the monitor of any part of a program being recorded on the wire and the pickup thereof by the pickup head and thereby varying the time interval during which the monitor may consider the character of such part of the program and act to open said output circuit if it is desired to prevent such part of the program from being transmitted.

EDWARD F. HOGAN.

REFERENCES CITED

The following references are of record in the file of this patent:

UNITED STATES PATENTS

| Number | Name | Date |
| --- | --- | --- |
| 2,038,647 | Clausen | Apr. 28, 1936 |
| 2,306,162 | Gipe | Dec. 22, 1942 |
| 2,380,392 | Begun | July 31, 1945 |